United States Patent
Lenkin et al.

(10) Patent No.: US 10,705,054 B2
(45) Date of Patent: Jul. 7, 2020

(54) METHOD FOR ULTRASONICALLY INSPECTING AN ALUMINOTHERMICALLY WELDED RAIL JOINT

(71) Applicant: OBSHCHESTVO S OGRANICHENNOJ OTVETSTVENNOST'YU "GT-ALUMINOTERMITNAYA SVARKA", St. Petersburg (RU)

(72) Inventors: Vladimir Dmitrievich Lenkin, St. Petersburg (RU); Valerii Gennadievich Klimov, St. Petersburg (RU); Ilya Zusevich Etingen, St. Petersburg (RU); Dmitrii Viktorovich Mishchenko, St. Petersburg (RU); Aleksey Viktorovich Lunev, St. Petersburg (RU)

(73) Assignee: OBSHCHESTVO S OGRANICHENNOJ OTVETSTVENNOST'YU'GT-ALUMINOTERMITNAYA SVARKA (RU)

(*) Notice: Subject to any disclaimer, the term of this patent is extended or adjusted under 35 U.S.C. 154(b) by 0 days.

(21) Appl. No.: 16/464,970

(22) PCT Filed: Dec. 27, 2017

(86) PCT No.: PCT/RU2017/000978
§ 371 (c)(1),
(2) Date: May 29, 2019

(87) PCT Pub. No.: WO2018/101860
PCT Pub. Date: Jun. 7, 2018

(65) Prior Publication Data
US 2019/0293606 A1 Sep. 26, 2019

(51) Int. Cl.
*B61K 9/10* (2006.01)
*G01N 1/28* (2006.01)
(Continued)

(52) U.S. Cl.
CPC ............. *G01N 29/043* (2013.01); *B61K 9/08* (2013.01); *B61K 9/10* (2013.01); *E01B 35/00* (2013.01);
(Continued)

(58) Field of Classification Search
CPC .... G01N 29/223; G01N 1/286; G01N 29/043; G01N 29/28; G01N 29/04; G01N 29/346;
(Continued)

(56) References Cited

U.S. PATENT DOCUMENTS 3,960,005 A 6/1976 Vezina
4,487,071 A * 12/1984 Pagano .................. G01N 29/07
73/612
(Continued)

FOREIGN PATENT DOCUMENTS

EP 001898759 * 3/2008
JP 2008137053 * 6/2008
(Continued)

*Primary Examiner* — Jacques M Saint Surin
(74) *Attorney, Agent, or Firm* — Garcia-Zamor Intellectual Property Law, LLC; Ruy Garcia-Zamor

(57) ABSTRACT

The invention relates to non-destructive ultrasonic testing of flat-bottom rails, laid on track, and can be used for detection of defects in tips of the rail foot on aluminothermic welded joints, performed by the intermediate casting method.

During the ultrasonic testing of aluminothermic welded joints, at least two zones for ultrasonic testing were determined with selecting one of at least two zones on the weld bead (reinforcing bead) from the lateral surface of the tip of the rail foot. At least two specific zones are grinded on the weld collar (reinforcing collar) with creation of at least two (Continued)

flat areas, which are able to ensure acoustic contact. The ultrasonic transducer is placed on every flat area of the collar, which is connected to at least one ultrasonic flaw detector. Ultrasonic testing of weld is performed using at least one flaw detector Delta-method or echo-method.

As a result of the invention implementation, there is no any "blind zone" in the base of the rail welded joint. The described invention ensures higher accuracy in detection of welds defects within the tips of the rail foot area. 2 z.p. f-ly, 8 il.

3 Claims, 4 Drawing Sheets

(51) Int. Cl.
| | |
|---|---|
| *G01N 29/22* | (2006.01) |
| *G01N 29/34* | (2006.01) |
| *E01B 35/00* | (2006.01) |
| *B61K 9/08* | (2006.01) |
| *G01N 29/04* | (2006.01) |

(52) U.S. Cl.
CPC ............. *G01N 1/286* (2013.01); *G01N 29/04* (2013.01); *G01N 29/223* (2013.01); *G01N 29/346* (2013.01); *G01N 2001/2866* (2013.01); *G01N 2291/0234* (2013.01); *G01N 2291/0289* (2013.01); *G01N 2291/044* (2013.01); *G01N 2291/048* (2013.01); *G01N 2291/0422* (2013.01); *G01N 2291/102* (2013.01); *G01N 2291/105* (2013.01); *G01N 2291/2675* (2013.01)

(58) Field of Classification Search
CPC ......... G01N 29/265; G01N 2291/2623; G01N 2291/102; G01N 2291/044; G01N 2291/048; G01N 2291/105; G01N 2291/0234; G01N 2291/2675; G01N 2001/2866; G01N 2291/0422; G01N 2291/0289; B61K 9/10; B61K 9/08; E01B 35/00
USPC .......................................................... 73/588
See application file for complete search history.

(56) References Cited

U.S. PATENT DOCUMENTS

| | | | | |
|---|---|---|---|---|
| 5,578,758 | A | * 11/1996 | Havira | .................... B30B 15/08 |
| | | | | 73/636 |
| 9,010,186 | B2 | * 4/2015 | Pagano | .................. G01N 29/04 |
| | | | | 73/636 |
| 9,816,964 | B1 | * 11/2017 | Nguyen-Dinh | ...... G01N 29/069 |

FOREIGN PATENT DOCUMENTS

| | | | |
|---|---|---|---|
| RU | 2309402 | | 10/2007 |
| RU | 002543112 | * | 2/2015 |
| RU | 2014118037 | | 11/2015 |
| RU | 2018105847 | * | 8/2019 |
| WO | 2010/141142 | | 12/2010 |

\* cited by examiner

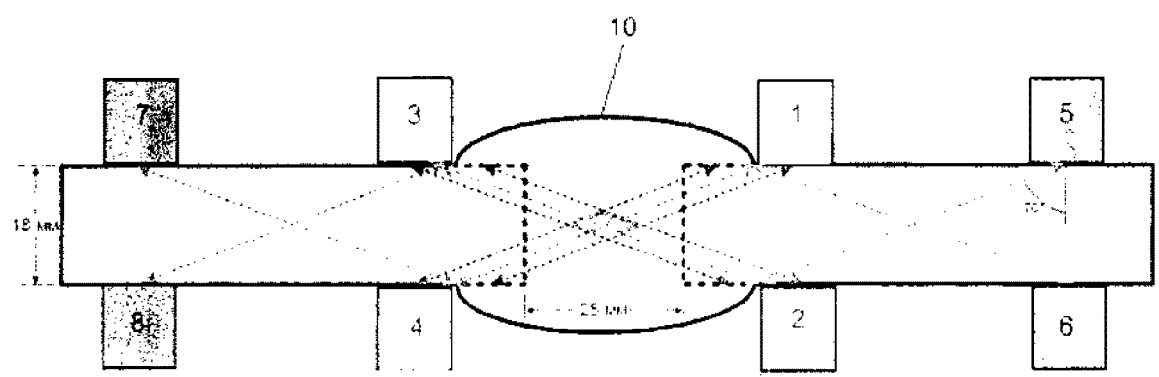
Fig. 1 State of art
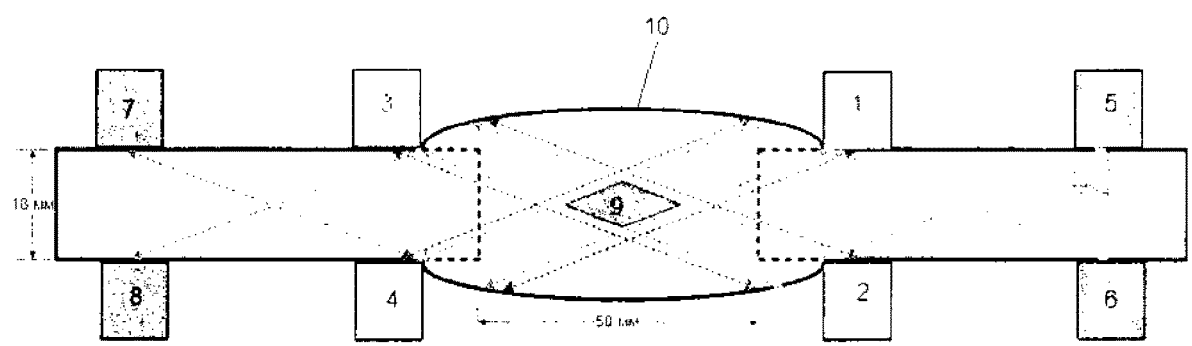
Fig. 2 State of art

METHOD FOR ULTRASONICALLY INSPECTING AN ALUMINOTHERMICALLY WELDED RAIL JOINT

CROSS REFERENCE TO RELATED APPLICATIONS

This application claims priority to the following Patent Application: (1) PCT application PCT/RU2017/000978 filed at Dec. 27, 2017; and (2) Russian patent application 2016147498, filed Dec. 1, 2016. The above-identified applications are hereby incorporated by reference in their entireties as if fully set forth herein.

TECHNICAL FIELD

The invention relates to non-destructive ultrasonic testing of railway rails, laid on the railway track, and can be used for the detection of defects of aluminothermic welded joints in the area of the rail foot, performed by the intermediate casting method.

PRIOR ART

In accordance with GOST 18576-85 (Nondestructive testing./Railway rails. Ultrasonic testing methods, M., Publishing house of standards, 1985), in order to test the rail's foot, it is allowed to transmit ultrasonic waves through the rail head running surface, where acoustic coupling conditions are optimum and can be applied during the 100% inspection of rails using demountable flaw-detection trolleys.

Such methods provide a high rate of the rail non-destructive testing. However, due to the specific shape of the rail profile, the ultrasonic testing method of the rail head running surface using flaw-detection carts does not guarantee the detection of defects in aluminothermic welds, performed by the intermediate casting.

In accordance with GOST 14782-86 (Nondestructive testing. Welded joints. Ultrasonic testing methods, M., Publishing house of standards, 1986), the welded joint is prepared for ultrasonic testing, when no defects are found in the joint. Shape and sizes of the heat-affected zone shall allow a move of the probe within the area that ensures scanning of welded joint or its part thereof subject to testing, using the probe's acoustic axis.

There is a rail testing method, when the aluminothermic weld in the rail foot area is tested by an transverse ultrasonic wave from the upper surface of the tip of the rail foot using the piezoelectric transducer with an input angle of 70 degrees (Standard STO RZhD 1.11.003-2009 Ultrasonic testing method for welds Technological instruction TI-07.96-2011). In this case, the defect is detected by a direct beam or a beam reflected from the lower surface of the rail foot.

This method is applicable for a standard aluminothermic weld (with the gap size between rails ends within 25±1 mm, and width of the weld collar within 40-45 mm) of the rail foot area. However, if it is required to execute a repair weld, the aluminothermic welding results a much wider weld joint (with the gap size between the rail ends within 50-75 mm, and the width of the collar within 70-100 mm) This method will not ensure detection of defects in the welded section center.

The blind zone can be determined by graphical construction of the weld cross section. The maximum possible angle of the ultrasonic shear wave entry into the metal is about 70 degrees (according to the Snell law). As shown on FIG. 1, during installation of the combined piezoelectric transducer operating via the pulse echo method in the position (1), (2), (3), (4) (the position, in which the transducer rests against the collar (10)), the area that cannot be scanned with an acoustic axis, is formed in the section center. When the sensor is shifted into the position of (5), (6), (7), (8), the section center will be scanned by the once reflected beam, which is allowed by the standard technical documentation. FIG. 2 graphically shows the propagation of ultrasonic waves in the welding section with an increased gap (50 mm), the "blind zone" (9) is formed in the section center, which cannot be scanned by direct and once reflected beam. Thus, in case of the increased welding gap, an area is formed in the section center, where the detection of defects is not guaranteed, and the size of this area expands with the welding gap increase. Therefore, this known method does not guarantee the detection of defects in welded joints of rail foots in case of a wide collar (10) (more than 45 mm).

Patent of the RF No. RU2309402, published on 27 Oct. 2007, contains the information about the ultrasonic testing method for rail joints, welded using the flash-butt method (welding of joints without a reinforcing collar). The method is notable for installation of several ultrasonic sensors in various zones of rails, in particular, on surfaces of the base blades and on lateral sides of the rail head. At the same time, all sensors are connected to one multichannel ultrasonic flaw detector MIG-UKS UDS 2-116 that allows using various scanning schemes between sensors and ensure the detection of defects almost through the entire rail section. According to the description, the sensors are fixed to the rails near the weld joint using clamping elements of any design or magnets, in order to ensure reliable acoustic contact. A gap between blocks of ultrasonic sensors and the rail surface is filled with an special liquid.

The technical solution can be deemed as the closest to the claimed one. Disadvantages of the known technical solution include inability to detect defects in aluminothermic-welded joints, since the method provides for installation of sensors directly on the tips of the rails foot in the welded area on the strict condition that the weld reinforcing collar is unavailable (the edges of the reinforcing collar will act as reflectors and the method will be impracticable).

The task, which is solved by using of the offered invention, is a development of the method, which allows to detect defects in aluminothermic welded joints at the tips of the rail foot with higher accuracy.

SUMMARY OF THE INVENTION

The set task is solved due to the fact that suggested method includes following stages:

determination of at least two zones for ultrasonic testing. Moreover, one of at least two zones is selected on welded joint from the lateral surface of the tip of the rail foot;

grinding of at least two specific zones with creation of minimum two flat areas, which are able to ensure acoustic contact;

installation of a sensor on each flat area, and the sensor is connected to the same ultrasonic flaw detector;

sequential ultrasonic testing of welded joint with echo and Delta methods using at least one above-mentioned flaw detector.

It is possible to apply the offered method, when at least one different zone for ultrasonic testing is selected from the following areas during determination of ultrasonic testing zones: lateral surface of the tip of the rail foot, upper surface of the tip of the rail foot.

It is possible to implement method, when the ultrasonic flaw detector installation and the weld ultrasonic testing are performed using at least one flaw detector for every specific zone in sequence.

A technical result is the higher accuracy during detection of weld joint defects in the tip of the rail foot area.

BRIEF DESCRIPTION OF DRAWINGS

FIG. 1, 2 show the scanning method as per prior art.

EMBODIMENTS OF INVENTION

Figure 3:
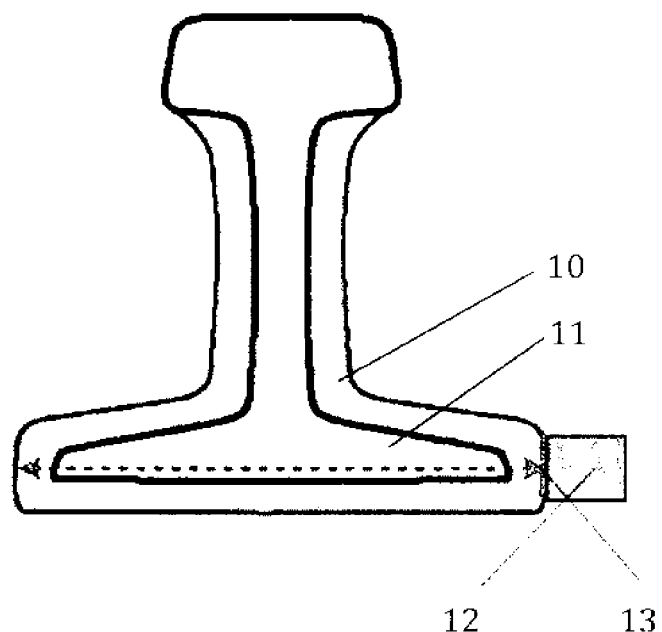
FIG. 3 shows the schematic diagram for implementation of the described method during the application of ultrasonic testing method from the lateral surface of the tip of the rail foot near the aluminothermic joint.
Figure 4:
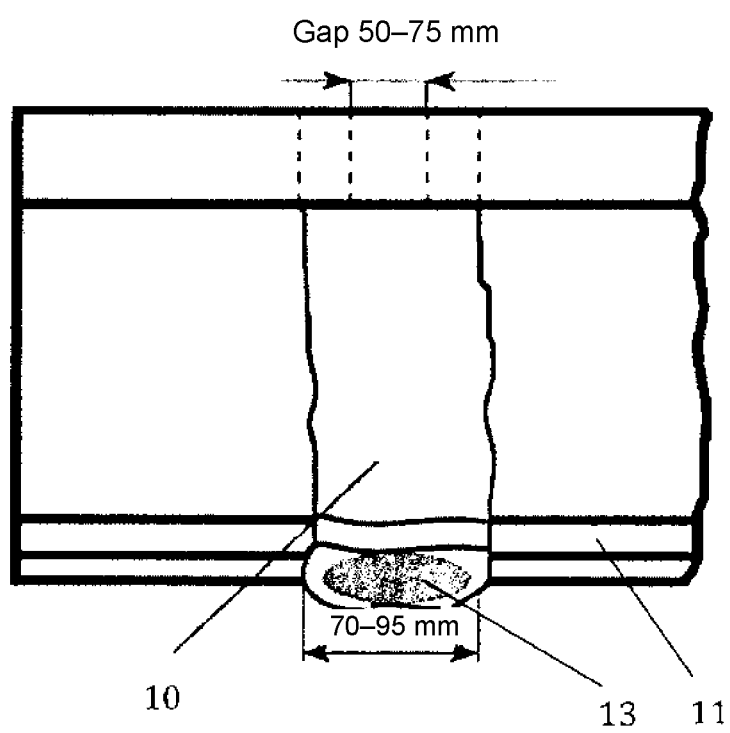
FIG. 4 shows the schematic diagram for implementation of the described method during application of ultrasonic testing method from the lateral surface of the tip of the rail foot near the aluminothermic joint (side view).

FIG. 3 shows the schematic illustration of embodiment of the described method for ultrasonic testing of an aluminothermic weld. The method can be implemented using at least one flaw detector (not shown) and at least one ultrasonic sensor (12), connected to the above-mentioned flaw detector. Avikon-02r UDS2-112 or UDS2-RDM-33, operating per echo- or Delta-methods, can be used as a flaw detector. According to GOST 55725-2013, the probes like RS PEP P112-2,5 and PEP P121-2,5 can be used as ultrasonic sensors.

As it will be clear to an expert, the illustrative example on FIG. 3 shows the simplified non-limiting embodiment, which is implemented from the lateral surface of the tip of the rail foot via one flaw detector and one ultrasonic sensor (12) RS PEP P112-2,5. The number of the sensors used depends on the selected zones and scanning patterns. As it is shown on FIG. 3.4, at least one ultrasonic sensor (12), connected to one flaw detector (not shown), is sufficient for implementation of the described method. If only one ultrasonic sensor (12) is applied, the ultrasonic testing is performed using one flaw detector in sequence for every specific zone.

Figure 5:
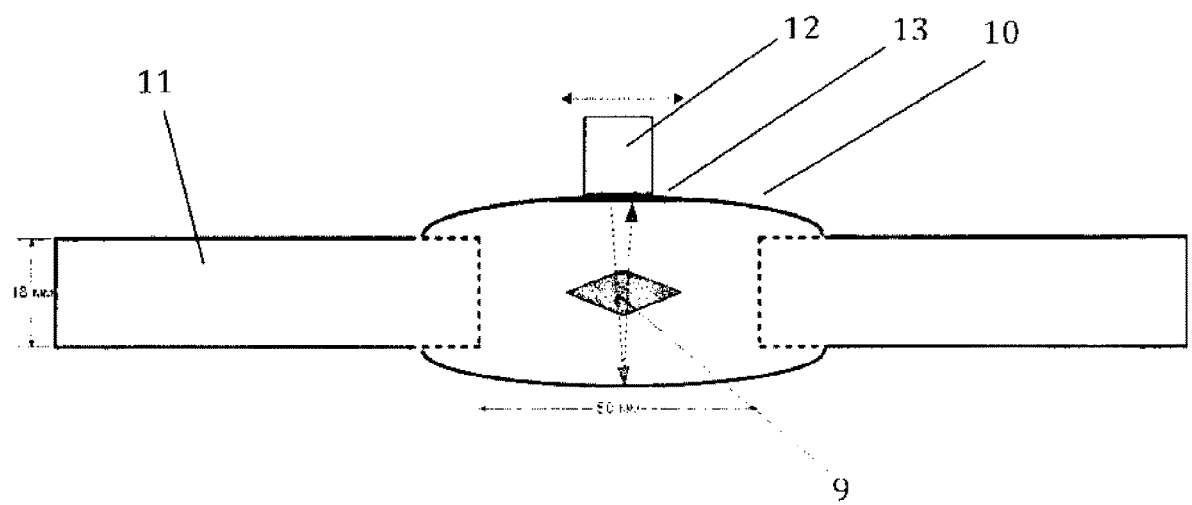
FIG. 5 shows the schematic diagram for implementation of the described method during the application of ultrasonic testing method from the upper surface of the tip of the rail foot near the aluminothermic joint.

FIG. 5 shows non-limiting embodiment, in case of which the upper surface of the tip of the rail foot is selected as at least half of zone for ultrasonic testing. Ultrasonic testing can be performed in sequence using one flaw detector (not shown) and one ultrasonic sensor (12) RS PEP P112-2,5.

Figure 6:
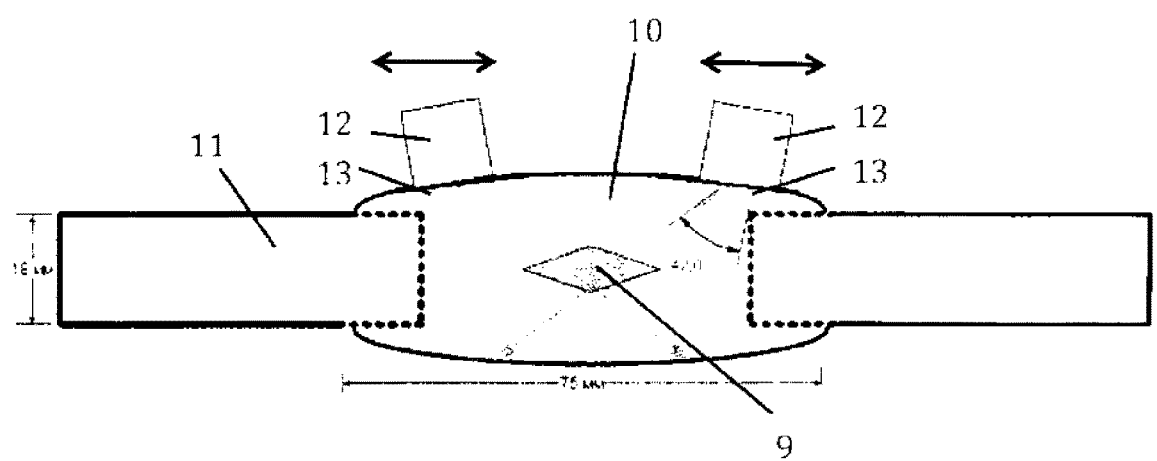
FIG. 6 shows the schematic diagram for different embodiment of the described method during the application of ultrasonic testing method from the upper surface of the tip of the rail foot near the aluminothermic joint.

In case of another invention embodiment, shown on FIG. 6, two ultrasonic sensors (12) PEP P121-2,5 with different angles of entry on two corresponding pads (13) can be installed on the upper surface of the tip of the rail foot (at least, a half of the zone for ultrasonic testing).

Figure 7:
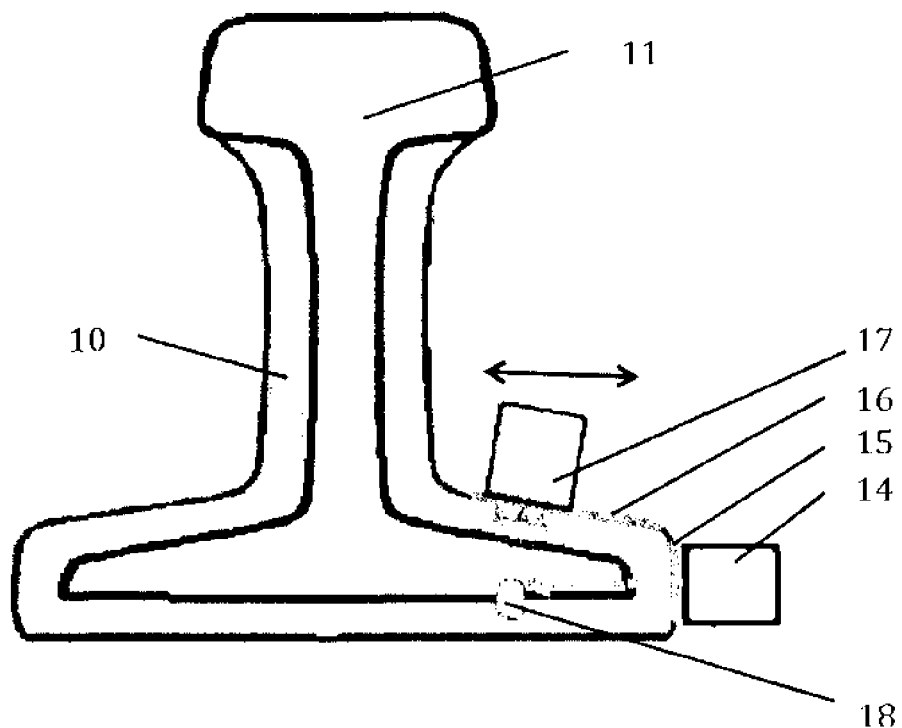
FIG. 7 shows the schematic diagram for implementation of the described method during application of ultrasonic testing method from the lateral surface of the tip of the rail foot and from its upper surface near the aluminothermic joint.
Figure 8:
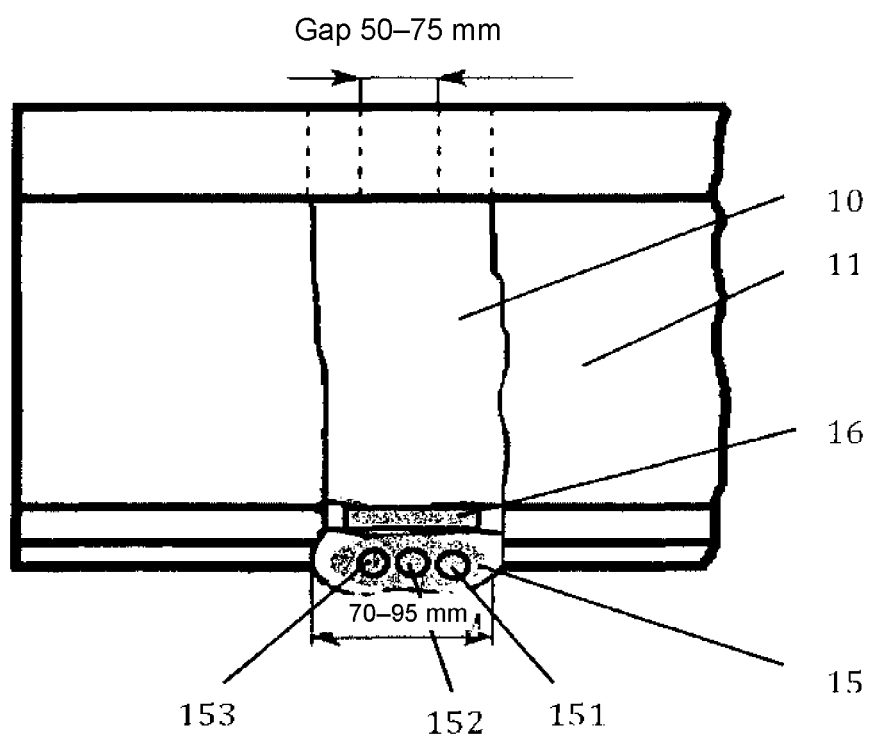
FIG. 8 shows the schematic diagram for implementation of the described method during application of ultrasonic testing method from the lateral surface of the tip of the rail foot and from its upper surface near the aluminothermic joint (side view).

FIGS. 7 and 8 show the schematic diagram for another embodiment of the described method during the application of ultrasonic testing method from lateral surface of the tip of the rail foot and from upper surface of the top of the rail foot near the aluminothermic joint (side view). Besides, the testing is performed via the Delta-method using two sensors (12), connected to one flaw detector via a separate circuit: one piezoelectric transducer-transmitter (14) and another piezoelectric transducer-receiver (17).

INDUSTRIAL APPLICABILITY

Description of implementation of described method for ultrasonic testing of the aluminothermic welded rail joint with reference to FIGS. 3, 4, 5, 6, 7, 8 is given below.

The method begins at a stage of determining at least two zones for ultrasonic testing. The determination is performed depending on sizes of the touch surface of ultrasonic sensors, selected scanning pattern of the blind zone, accessibility for preparation of a pad by grinding. Moreover, one of at least two zones is selected on welded joint from the lateral surface of the tip of the rail foot (11) (FIG. 3-4, FIG. 7-8).

At least one different ultrasonic inspection zone is selected, for example, on the upper surface of the tip of the rail foot on the weld collar (10), as shown on FIG. 5, 6, 7.

Ultrasonic testing zones are defined based on the following principle: scanning of the weld section center (blind zone) with the transducer's acoustic axis using direct beam.

Then, at least two determined zones are ground with creation of minimum two appropriate pads (13) ((15), (16)) that ensure acoustic coupling of ultrasonic sensors (12) ((14), (17)). Grinding can be performed by any available means, such as angle grinder, operating from the mains or from an accumulator battery.

The ultrasonic sensor (12) ((14) (17)) is installed on each flat area (13) ((15), (16)), which is connected to at least one ultrasonic flaw detector, and the section center (blind zone) of rails (11) weld is scanned.

In the general case, shown on FIG. 3, 4, one of at least two zones is selected on the weld bead (10) (reinforcing bead) from the lateral surface of the tip of the rail foot. Then, the area is grinded, in order to form a flat surface (13) for ultrasonic sensor (12), and the weld is ultrasonically tested using at least one echo flaw detector.

In accordance with non-limiting embodiment, shown on FIG. 5, another area of at least two zones is selected on the upper surface of the tip of the rail foot at the bead (10). Then, the area is ground, in order to form a flat surface (13) for ultrasonic sensor (12), and the weld is ultrasonically tested using at least one echo flaw detector. Upon the completion of the above stages on one of the tops of the rail foot, similar stages can be completed on the opposite tip of the rail foot.

According to another non-limiting embodiment, shown on FIG. 6, two zones on the upper surface of the tip of the rail foot (11) can be selected as at least one another zone. Moreover, flat areas (13) are arranged symmetrically at an angle of 40-50° to the surface on the edges of the tip of the rail foot (10). For example, for the welding gap of 50 mm, the angle is 40°; for the gap of 75 mm, the angle is 50°. The entry angle is defined graphically at scale provided that center of the "blind zone" is scanned with the transducer acoustic axis. If only one ultrasonic sensor (12) is used, is installed on every prepared pad (13) in parallel or in series for further ultrasonic testing of weld using at least one pulse echo flaw detector, mentioned above. Upon the completion of the above stages on one of the tips of the rail foot, similar stages can be completed on the opposite tip of the rail foot.

It is possible to apply embodiment, when an ultrasonic test is firstly performed from the lateral surface of the tip of the rail foot on the right and on the left (on right and left tips of the rail foot (11)), and then at least one different zone is ultrasonically tested. Thus, the procedure for performing ultrasonic testing in certain areas is not a limiting condition.

Availability of an echo signal with the amplitude, exceeding the rejectable level, will be regarded as an indication of the detected defect. Ultrasonic testing is performed, for example, by measuring the amplitude of received signals for each ultrasonic transducer, receiving the reflected signal at current moment. The time position of received signals, i.e. time frame between transmitted and received signals is measured. The defect spatial position is calculated using the known scanning pattern, the time position of received signals and a propagation speed of ultrasonic signal in rail. Results of all scans are subject to evaluation and decision with regard to the rail weld quality will be made. For this purpose, the location and amplitudes of received signals are cross checked, in order to create a basis for quality conclusions.

If only one ultrasonic sensor (12) is used, stages of installation, fixation, and ultrasonic inspection are initially performed for one specific ultrasonic testing zone, and then for at least one another specific ultrasonic inspection zone in sequence. Subsequently, the method can be completed or repeated for the same or other zones.

Illustrative example on FIG. 7, 8 shows that the scanning is performed using Delta-method that involves two transducers (12), connected via a separate connection circuit to one flaw detector (one piezoelectric transducer-transmitter (14) and another piezoelectric transducer-receiver (17)). A flat area (15) shall be arranged for transmitter (14) at the lateral surface of the tip of the rail foot (11), and another pad (16) shall be arranged for receiver (17) at the upper surface of the tip of the rail foot (11).

The flat area (15) is arranged by a grinding the lateral surface of the tip of the rail foot (11) along the entire length of the collar (10). the flat area (16) is arranged for receiver (17) by grinding the upper surface of the top of the rail foot in the center of the collar (10) with a width of 20-40 mm. Testing procedure (FIG. 8)—a transmitter (14) is placed into position (151) on the flat area (15), then, using receiver, (17) scan from the foot edge to the rail web by moving the receiver (17) along flat area (16). Then, transmitter (14) is shifted into position (152), and receiver (17) is used for scanning from web to the foot edge by moving the receiver (17) along flat area (16). Then, the transmitter (14) is shifted into position (153), and receiver (17) is used for scanning from web to the foot edge by moving receiver (17) along flat area (16). It should be noted that the illustrative example on FIG. 8 shows 3 positions (151), (152), (153) of transmitter (14), however, in order to implement the described method, a larger or smaller number of positions of transmitter (14) on flat area (15) can also be used, depending on the collar (10) width and a selected model of ultrasonic sensor (12) (transmitter (14)). The above scanning operations shall be repeated, until the transmitter (14) moves from one edge of the flat area (15) to its another edge (15) across the collar (10). Upon completion of scanning operations of one (for example, left) flat area, the same operations are conducted on another flat area (for example, right). A defect (18) detection will be proved by the receiver is fixed the signal diffracted on the defect (diffraction effect will take place when the wave is on the defect).

As a result of implementation of the claimed method, there is no any "blind zone" in the base of rail's welded joint. The method ensures higher accuracy of the weld defects detection in the tips of the rail foot area (11).

The invention claimed is:

1. A method of ultrasonic testing of aluminothermic welded joints on rails including stages as follows:
    determination of at least two zones for ultrasonic testing with selecting one of at least two zones on the weld collar (reinforcing collar) from the lateral surface of the tips of the rail foot;
    grinding of the specific areas on the collar (reinforcing collar) with creation of flat areas that enable acoustic contact;
    placement of ultrasonic transducer on every flat area on the collar, which is connected to at least one ultrasonic flaw detector; and
    ultrasonic testing of weld using at least one flaw detector via Delta-method or echo-method.

2. The method of claim 1, in which at least one another zone of ultrasonic testing is selected from the following areas during determination of ultrasonic testing zones: lateral surface of the tip of the rail foot, upper surface of the tip of the rail foot.

3. The method of claim 1, in which stages of ultrasonic flaw detector installation and welds ultrasonic testing are performed using at least one flaw detector for every specific zone in sequence.

* * * * *